UNITED STATES PATENT OFFICE.

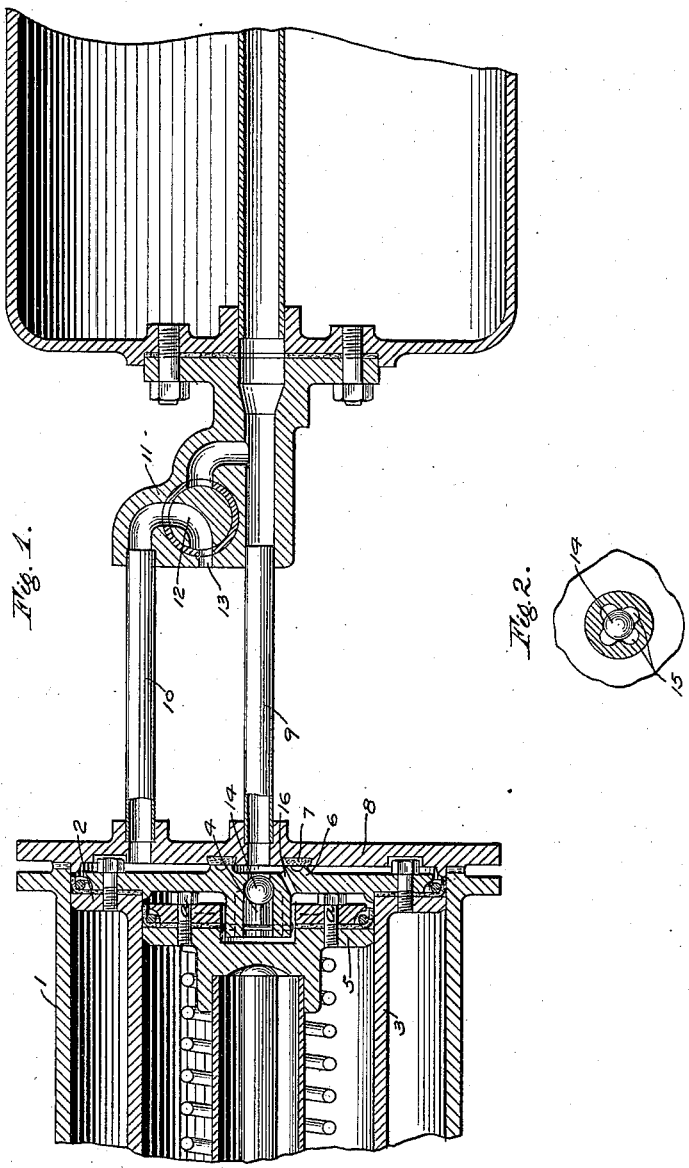

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,027,939.  Specification of Letters Patent.  Patented May 28, 1912.

Application filed November 3, 1909. Serial No. 526,029.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake equipment in which a small brake cylinder is adapted to be employed at one time and a larger brake cylinder at another time, such as a light and load brake for giving heavy braking power when the car is loaded and light braking power when the car is empty.

A very desirable apparatus of the above character employs a construction in which the smaller brake cylinder is contained within the larger, the smaller brake cylinder being constantly open to a brake cylinder supply passage and means being provided for also connecting the large brake cylinder to said supply passage.

It has been found that with an apparatus such as above described, if the brakes are applied through the action of the small brake cylinder and the controlling means should then be turned to its position for connecting in the large brake cylinder, fluid in the small brake cylinder can equalize into the piston chamber of the large brake cylinder and as there is no pressure to oppose the outward movement of the large brake piston, the same may be suddenly pushed out with such force as to sometimes cause breakage or other damage by coming in contact with the small brake piston.

The main object of my invention is to overcome the above difficulty and for this purpose means are provided for restricting the back flow of fluid from the small brake cylinder.

In the accompanying drawing, Figure 1 is a sectional view of a duplex brake cylinder equipment embodying my improvement; and Fig. 2 a transverse section on line *a—a* of a portion of the large brake piston, showing the ports around the check valve.

According to the construction shown in Fig. 1 a large brake cylinder 1 is provided containing a large brake piston 2 having walls forming a small brake cylinder 3, the cover plate of the small brake cylinder being the large piston 2. The brake piston 2 has a central port opening 4 through which air may be supplied to the small brake piston 5, contained in the brake cylinder 3, and the piston 2 is provided with an annular rib 6 around the port opening 4 and a gasket 7 is located in the large cylinder head 8 so that the large brake cylinder may be cut off from the brake cylinder supply pipe 9 by the seating of rib 6 on gasket 7. Branch pipe 10 supplies air to the large brake cylinder 1 and means are interposed in said pipe for controlling communication from the supply pipe 9, such as a manually operated cock 11 having a cavity 12 therein adapted in one position to connect the pipe 10 and the large brake cylinder with an atmospheric port 13 and in another position the pipe 9 with the pipe 10. Communication through port opening 4 is controlled by preferably a ball check valve 14 adapted to seat in a direction to prevent flow of air from the small brake cylinder back to the supply pipe, passages or grooves 15 being provided around the check valve to permit the free flow of air to the small brake cylinder in applying the brakes.

It will now be clear that when the cock 11 is in the position shown in Fig. 1 of the drawing the large brake cylinder 1 is cut off from the brake cylinder supply pipe 9 and in applying the brakes air is supplied only to the small brake cylinder through the grooves 15 around the check valve 14. By turning the cock 11, the cavity 12 is caused to connect the supply pipe 9 with pipe 10, so that air is supplied to the large brake cylinder in applying the brakes. If, when the small brake cylinder contains fluid pressure, the cock 11 should be turned to the position for connecting in the large brake cylinder it will be evident that the air in the small brake cylinder is prevented from escaping and flowing into the large brake cylinder, by means of the check valve 14, consequently all danger of suddenly forcing out the large brake piston against the small brake piston is avoided.

A restricted port 16 is provided through the large brake piston 2 so that in releasing the brakes air may be discharged from the small brake cylinder through said port, the port being of restricted area so that in the event of turning the cock 11 to position opening communication to the large brake cylinder air can not flow from the small to the large brake cylinder fast enough to cause the large brake piston to move out rapidly.

Having now described my invention, what I claim as new and desire to secure by Letters Patent, is:—

1. In a fluid pressure brake, the combination with two brake cylinders and a valve mechanism for cutting in one of said cylinders, of a restricted port for limiting the flow of fluid from one brake cylinder to the other brake cylinder.

2. In a fluid pressure brake, the combination with a brake cylinder communicating with a fluid pressure supply passage and another brake cylinder adapted to be connected to said passage, of means for restricting the back flow of fluid from the first brake cylinder.

3. In a fluid pressure brake, the combination with a brake cylinder in open communication with a passage through which fluid under pressure is supplied thereto, another brake cylinder, and a valve mechanism for connecting the latter brake cylinder to the supply passage, of means for checking the back flow of fluid from the first brake cylinder to the supply passage.

4. In a fluid pressure brake, the combination with a brake cylinder having a fluid supply passage, another brake cylinder and valve means for connecting the latter brake cylinder to said supply passage, of a check valve interposed in the supply passage to restrict the flow of air from the first mentioned brake cylinder.

5. In a fluid pressure brake, the combination with a large brake cylinder and piston, a small brake cylinder and piston carried by the large piston, the large piston forming a head for the small cylinder and having a port therein for supplying air to the small brake cylinder, of a check valve in said port.

6. In a fluid pressure brake, the combination with one brake cylinder having a supply passage, another brake cylinder having means adapted to connect the latter brake cylinder to said supply passage, of means for preventing back flow of air from the first brake cylinder, said brake cylinder having a restricted port for permitting the gradual release of air therefrom.

In testimony whereof I have hereunto set my hand.

WALTER V. TURNER.

Witnesses:
Wm. M. Cady,
A. M. Clements.